United States Patent [19]

Clary

[11] 4,083,773

[45] Apr. 11, 1978

[54] FRUIT HARVESTING MACHINE WITH LEAF SEPARATION MEANS

[75] Inventor: Roger Clary, Loudun, France

[73] Assignee: Howard Machinery Limited, Bury St. Edmunds, England

[21] Appl. No.: 620,413

[22] Filed: Oct. 7, 1975

[30] Foreign Application Priority Data

Oct. 8, 1974 France .................. 74 33867

[51] Int. Cl.² .............................................. B07B 4/02
[52] U.S. Cl. .................................. 209/134; 209/146; 56/330
[58] Field of Search ................. 56/33, 320, 330; 209/134, 133, 3, 135, 136, 137, 145, 143, 146, 147

[56] References Cited

U.S. PATENT DOCUMENTS

| | | | |
|---|---|---|---|
| 1,716,769 | 6/1929 | Friend | 56/33 |
| 2,717,482 | 9/1955 | Hill | 56/33 X |
| 3,015,928 | 1/1962 | Kappelmann | 56/33 |
| 3,163,471 | 12/1964 | Williams | 56/33 X |
| 3,306,018 | 2/1967 | Whitman | 209/133 X |
| 3,449,895 | 6/1969 | Pertics | 56/330 |
| 3,538,694 | 11/1970 | Holloway | 56/330 X |
| 3,601,964 | 8/1971 | Fisher | 56/320 X |
| 3,601,965 | 8/1971 | Kaesshohrer | 56/320 X |
| 3,636,688 | 1/1972 | Fontan | 56/330 |
| 3,685,266 | 8/1972 | Mohn | 56/330 |
| 3,827,222 | 8/1974 | Toti | 56/330 |

FOREIGN PATENT DOCUMENTS

| | | | |
|---|---|---|---|
| 286,022 | 3/1970 | Austria | 56/330 |
| 2,207,640 | 6/1974 | France. | |
| 1,166,596 | 3/1964 | Germany | 209/134 |

*Primary Examiner*—Robert Halper
*Attorney, Agent, or Firm*—Wegner, Stellman, McCord, Wiles & Wood

[57] ABSTRACT

A fruit gathering machine, by which the fruit is released by means of shakers, is provided with means for separating out leaves which are removed at the same time. The leaves and fruit fall towards lateral discharge conveyors and each conveyor has air ducting with outlet openings whereby air jets are directed from opposite sides of the conveyor. An upper jet of air discharges the leaves from the machine.

The machine is specially adapted for use in grape gathering.

7 Claims, 3 Drawing Figures

FRUIT HARVESTING MACHINE WITH LEAF SEPARATION MEANS

This invention relates to a fruit gathering machine, particularly but not exclusively for gathering grapes.

Known grape gathering machines are provided with means for shaking the plant in a manner such that the grapes are detached and fall onto a base in the form of a roof along the edges of which are disposed conveyors. The grapes roll along the base to conveyors which discharge them from the machine. The shaking action presents nevertheless the problem that the leaves of the vine also fall down and this makes it necessary it remove them before crushing the grapes. Most of the known machines try to remove the leaves by flows of air at a point in the conveying system where the fruit falls from one conveyor to another. For example at the point of transfer of the conveyor to an elevator, or at the upper end of the elevator when the fruit is discharged onto a lateral conveyor of the machine. These systems enable the removal of the leaves but not until they have formed an intimate mixture with the fruit and the free juice, resulting from the necessary beating for removing the grapes and their stalks. From this a loss of juice results and this is often important in the case where the leaves are saturated with juice.

The invention has for an object overcoming the disadvantages referred to by providing a simple device for eliminating the leaves at the level of the first conveyor before the leaves have been mixed with the fruit and impregnated with the free juice.

For this purpose according to the invention a fruit gathering machine comprises a frame mounted on a wheeled vehicle chassis, which frame forms a tunnel disposed along the central longitudinal axis of the vehicle and closed at its base by closing means movable away from the longitudinal axis to allow the stalks of the fruit plant to pass therethrough, the external edges of the closing means being fixed to two conveyors extending parallel to the longitudinal axis and disposed at each side of the vehicle frame, at least along part of the exterior of the frame, the internal edge of each conveyor forming an air duct having openings directed towards the exterior of the tunnel and situated at the level of the conveyor, wherein the external edge of each conveyor also constitutes an air duct whose openings are directed towards the interior of the tunnel and are also situated at the level of the conveyor.

Preferably the flows of air of each of the air ducts associated with each conveyor are adjustable, at least in relation to one another.

Further features of the invention will appear from the following description of an embodiment of the invention given by way of example and with reference to the accompanying drawings in which.

Figure 1:
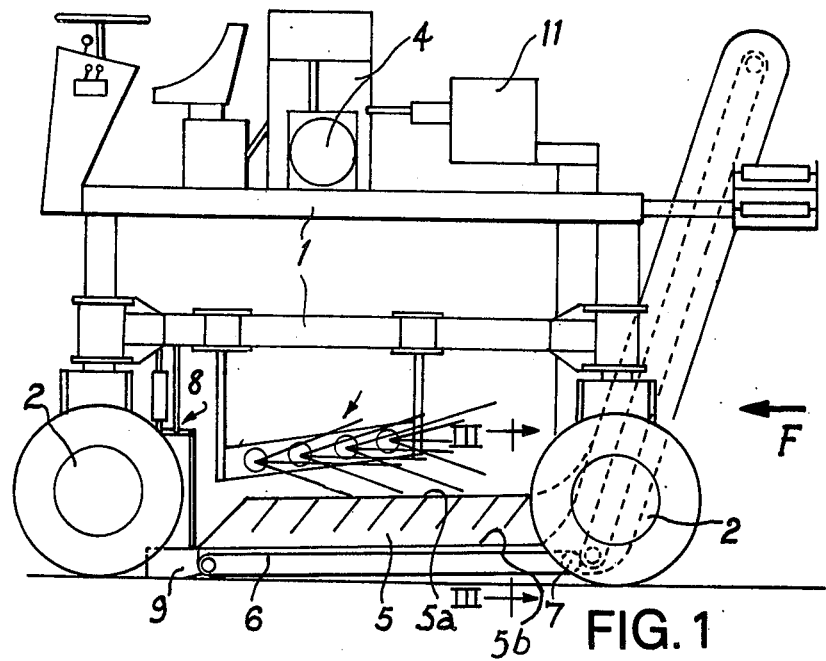
FIG. 1 is a side elevation of a fruit gathering machine.
Figure 2:
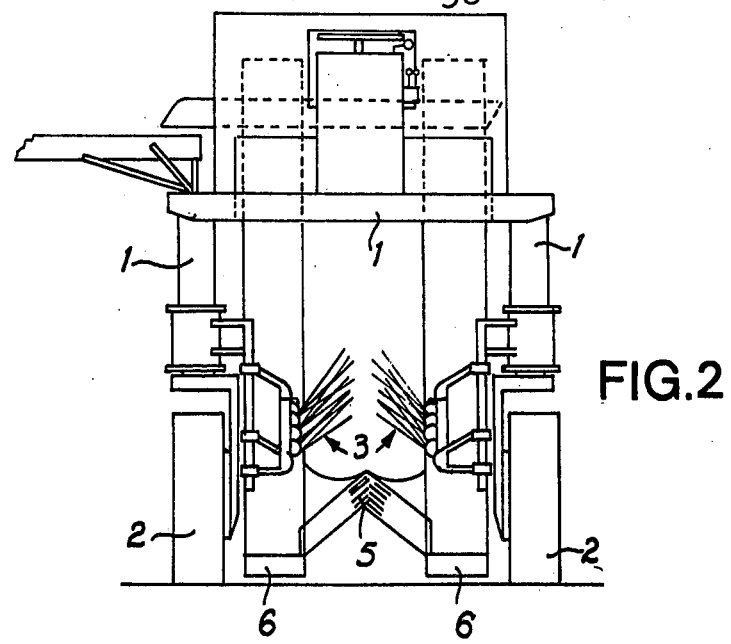
FIG. 2 is an end elevation of the machine of FIG. 1.

Referring to FIGS. 1 and 2 a grape gathering machine includes an arched chassis 1 having wheels 2. The lateral parts of the chassis 1 are provided with shaking means 3 in known manner actuated by means of a motor 4. The base of the machine is formed by a sealed closing means 5 movable in known manner to allow the passage of the vine plants along the longitudinal axis of the frame. The closing means 5 has along the longitudinal axis of the machine, an upper ridge 5a and is pivoted by its lateral edges 5b, at a lower level than the ridge 5a, to the two conveyors 6, which are for example endless belt conveyors. In the embodiment shown each of the conveyors is pivoted by one of its ends to the rear of the machine chassis about an axis 7 while the free end is also attached to the chassis by means of a support device 8 which enables a vertical displacement of the conveyors with respect to the chassis constituting a lower abutment which is adjustable in its displacement. The device 8 can be formed of a hydraulic ram as shown in which the shaft constitutes a lever pivoted to the chassis.

Each of the conveyors 6 is fitted with a lower foot 9 in the form of a shoe or a plough share which constitutes a pressure point on the soil of the conveyor when it is not in abutment with the support means 8.

Figure 3:
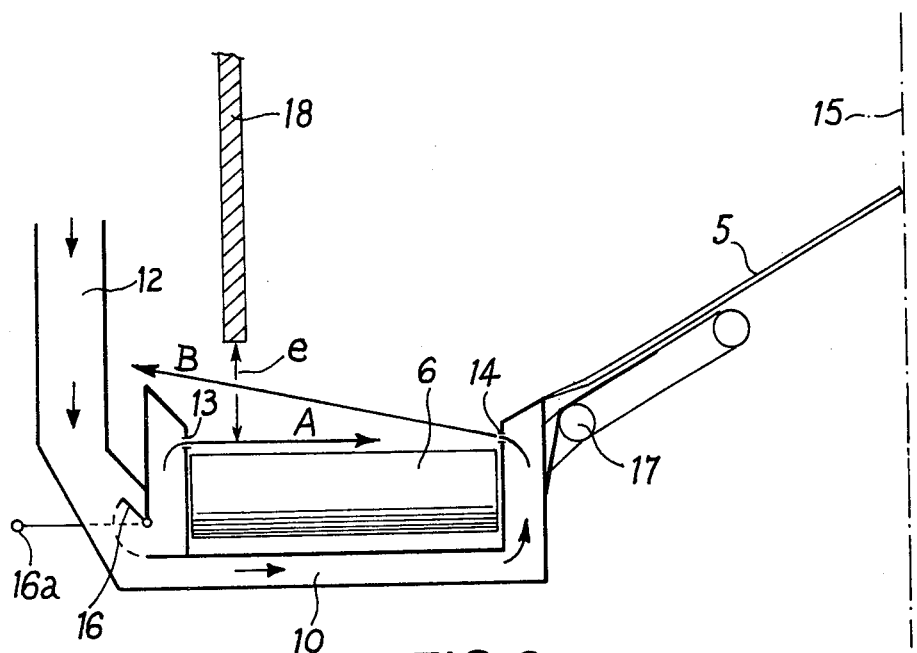
FIG. 3 is a schematic section substantially on the line III—III in FIG. 1 of part of the machine of FIGS. 1 and 2.

Referring to FIG. 3, a closed duct 10 surrounds three sides of the conveyor 6. This duct 10 is in communication with an air compressor 11 (FIG. 1) by means of a conduit 12. The duct 10 overlaps slightly each of the sides of the conveyor 6 and is provided at the level of the conveyor with two series of openings 13 and 14, one directed towards the axis 15 of the machine and the other directed towards the exterior of the machine. A regulation valve 16 controls the flow of air to the two lateral sides of the duct and is capable of being moved by a lever 16a externally of the ducting.

The closing means 5 is attached to the ducting 10 by means of a resilient device 17 which enables withdrawal of the means 5 during passage of the vine plants.

A lateral wall 18 is attached to the machine chassis 1 and the wall 18 is not shown in FIGS. 1 or 2 for reasons of clarity. The wall 18 is part of an envelope of the machine closing the chassis to form a kind of tunnel in which the vines are shaken. The position of the conveyor 6 with respect to this wall is such that it overlaps onto the exterior of the tunnel. Moreover the wall 18 leaves a certain free space e above the conveyor 6. It is apparent that the corresponding conveyor on the opposite side of the axis 15 is similarly equipped.

In operation the beater means 3 detach the fruit and some leaves from the vine plant. The fruit or grapes are heavier than the leaves and fall onto the closing means 5 and roll towards the conveyors 6. At the same time the leaves float down towards the means 5 or the conveyor 6. The leaves encounter a curtain of air which protects the conveyor against leaves falling thereon. The compressed air coming into the ducting 10 through the conduit 12 jets through the series of holes 13 and 14. In adjusting, by means of the valve 16, the relative flows of each kind of air, the air leaving the openings 13 in the direction of the arrow A forms a deflector for the air leaving the openings 14 which is directed according to the arrow B to the exterior of the wall 18. The leaves falling directly by means of the member 5 towards the conveyor 6 are entrained and carried away from the machine in the direction of the arrow B by air coming from the openings 14.

The jet of air A is very useful because it keeps the jet of air B away from the conveyor, the jet of air B being the carrier of the removed leaves, so as to enable the avoidance of leaves landing on the conveyor 6 and on the grapes carried thereby. Moreover if a leaf succeeds in crossing the upper curtain of air shown by the arrow B it is picked up by the lower curtain of air coming from the openings 13 and has every chance of being ejected at the level of the openings 14 by the second jet of air.

The adjustment of the valve 16 together with the possibility of adjusting the flow of air by the speed of the compressor, enables the force and the direction of the curtain of air from the openings 14 to be adapted according to the weight of leaves which can vary according to the vines or the atmospheric conditions at the moment when gathering takes place.

An advantage of the system of leaf separation according to the invention is that it inhibits intimate contact between the main product and the leaves which are then easier to eliminate because they are dry. Furthermore there is little loss of juice which would result if the leaves were saturated with juice. Since the leaves are not carried on the conveyors overfilling or mixing on the conveyors to the point of discharge is avoided.

Furthermore the combined arrangement of the pivot 7, the support device 8, and the foot 9 permit adjustment of each of the conveyors 6 with respect to the ground by which it can follow undulations. The device 8 only provides a lower abutment for the conveyor which makes it possible to be lifted when the foot slides on a small obstruction by turning about its rear pivot 7. By this arrangement the machine can be used for a great variety of vines particularly very low vines. Moreover the machine does not rest on its conveyors which would give rise to the risk of damage because of obstacles. The device 8 enables manual or automatic adjustment of the conveyors in this respect.

The invention is of particular relevance to the field of the construction of agricultural machines.

What I claim as my invention and desire to secure by Letters Patent of the United States is:

1. In a machine for gathering fruit of the type which comprises a frame mounted on a wheeled vehicle chassis, the frame forming a tunnel disposed along the central longitudinal axis of the vehicle, beater means in the tunnel to dislodge fruit, and two conveyors extending parallel to the longitudinal axis and disposed at the sides of the vehicle frame to convey dislodged fruit, at least a part of each conveyor being located to the interior of said frame, the improvement comprising, in combination:
   first air duct means along the internal edge of each conveyor having openings to direct air outwardly above the conveyor toward the exterior of the frame;
   second air duct means along the external edge of each conveyor having openings to direct air inwardly above the conveyor toward the interior of the tunnel;
   means for blowing air through both said air duct means to form first and second oppositely flowing transverse air currents;
   and means for adjusting the relative air flow through said first and second air duct means so that said first and second air currents cooperate to provide air curtain means through which dislodged fruit falls onto the conveyors, said air curtain means effectively entraining said light debris and carrying said debris away from the conveyor toward the exterior of the frame.

2. The improvement of claim 1 wherein each conveyor is pivoted at its rear end on a transverse axis and which includes adjustment means connected to a forward portion of each conveyor for adjusting the angle of the conveyor with respect to the vehicle chassis.

3. The improvement of claim 1 in which the means for adjusting the relative air flow is set so that the first air current forms an outwardly and upwardly inclined upper curtain of air, and the second air current forms a generally horizontal lower curtain of air below said inclined upper curtain of air.

4. The improvement of claim 1 in which the position and orientation of the first and second air duct means are such as to direct both said air currents substantially horizontally, and the means for adjusting the relative aid flow is set so that the second air current impinges upon the first air current to deflect said first air current upwardly to define an inclined first air curtain beneath which is a generally horizontal second air curtain.

5. In a machine for gathering fruit of the type which comprises a frame mounted on a wheeled vehicle chassis, the frame forming a tunnel disposed along the central longitudinal axis of the vehicle, beater means in the tunnel to dislodge fruit, and two conveyors extending parallel to the longitudinal axis and disposed at the sides of the vehicle frame to convey dislodged fruit, at least a part of each conveyor being located to the interior of said frame, the improvement comprising, in combination:
   first air duct means along the internal edge of each conveyor having openings to direct air outwardly above the conveyor toward the exterior of the frame;
   second air duct means along the external edge of each conveyor having openings to direct air inwardly above the conveyor toward the interior of the tunnel;
   and means for blowing air through both said air duct means to form first and second oppositely flowing transverse air currents which are so related that they cooperate to provide an upper air curtain and a lower air curtain through which dislodged fruit falls onto the conveyors, said two air curtains effectively entraining said light debris and said upper air curtain carrying said debris away from the conveyor toward the exterior of the frame.

6. The improvement of claim 5 in which the position and orientation of the first and second air duct means are such as to direct both said air currents substantially horizontally, and the relationship of said air currents is such that the second air stream impinges upon the first air current to deflect said first air current upwardly to define an inclined upper air curtain beneath which is a generally horizontal lower air curtain.

7. The improvement of claim 5 which includes means for adjusting the relative flow of air through the first and second air duct means.

* * * * *